(12) United States Patent
Haglöf

(10) Patent No.: US 7,475,493 B2
(45) Date of Patent: Jan. 13, 2009

(54) DIAMETER MEASURING INSTRUMENT

(75) Inventor: Stefan Haglöf, Helgum (SE)

(73) Assignee: Haglof Sweden AB, Langsele (SE)

( * ) Notice: Subject to any disclaimer, the term of this patent is extended or adjusted under 35 U.S.C. 154(b) by 0 days.

(21) Appl. No.: 11/915,740

(22) PCT Filed: May 22, 2006

(86) PCT No.: PCT/SE2006/050149

§ 371 (c)(1),
(2), (4) Date: Nov. 28, 2007

(87) PCT Pub. No.: WO2006/130099

PCT Pub. Date: Dec. 7, 2006

(65) Prior Publication Data

US 2008/0209750 A1    Sep. 4, 2008

(30) Foreign Application Priority Data

May 30, 2005    (SE)    ................................. 0501216

(51) Int. Cl.
*G01B 5/00* (2006.01)
(52) U.S. Cl. .......................................... 33/784; 33/783
(58) Field of Classification Search .................. 33/784, 33/783, 793–796, 806–807, 810–811, 813, 33/819–820, 823, 558.01, 558.02, 558.04, 33/558.05, 558.2
See application file for complete search history.

(56) References Cited

U.S. PATENT DOCUMENTS

| | | | | |
|---|---|---|---|---|
| 1,245,213 A | | 11/1917 | Gammeter | |
| 1,253,096 A | * | 1/1918 | Preston | 33/461 |
| 1,363,825 A | | 12/1920 | Taylor | |
| 1,394,347 A | * | 10/1921 | Pierson | 33/203 |
| 2,808,651 A | * | 10/1957 | Johnson | 33/507 |
| 5,490,335 A | * | 2/1996 | Chu | 33/810 |
| 6,990,746 B2 | * | 1/2006 | Penna et al. | 33/784 |
| 7,076,886 B2 | * | 7/2006 | John et al. | 33/784 |

FOREIGN PATENT DOCUMENTS

| | | |
|---|---|---|
| GB | 1913 14309 A | 6/1914 |
| GB | 335918 A | 10/1930 |

* cited by examiner

*Primary Examiner*—Yaritza Guadalupe-McCall
(74) *Attorney, Agent, or Firm*—Young & Thompson

(57) ABSTRACT

A caliper-like instrument for measuring tree diameters, includes a straightedge on which there is placed a first leg and a second leg. The instrument further includes a recording unit adjacent the first leg for recording and storing tree diameter measurements. The first leg is fixedly placed along the straightedge, and the second leg projects out from a slide displaceable along the straightedge, with the legs and the straightedge located in mutually the same plane. The first leg can be lowered in the plane and is pivotally fastened to an attachment on the straightedge, and the second leg can be lowered in the plane and is pivotally attached to the slide. The first leg has a first fastener intended to be hooked into the attachment and the second leg has a second fastener intended to be hooked into the slide.

4 Claims, 1 Drawing Sheet

DIAMETER MEASURING INSTRUMENT

The present invention relates to a calliper-type instrument for measuring the diameter of trees in respect of forest surveys.

A known type of callipers include a straightedge along which a slide can be displaced. There is affixed to one end of the fixed scale and also to one end of the straightedge and also to the displaceable slide a respective leg between which measuring of a tree diameter is effected. The measurement is indicated by the position of the slide along the straightedge. Such measuring callipers are known in the art.

Also known in the art are electronic callipers in which said position is indicated and stored electronically and with which the measurement is presented on a display carried by the slide. Also known are callipers which include data entering keys by means of which the operator can enter data concerning the type of tree concerned and therewith store this data in the memory of the callipers together with the diameter of the tree measured.

These known callipers are used in forest surveys that are carried out under shifting weather conditions, meaning that the callipers must be both robust and durable with respect to prevailing weather conditions.

Because the trunks of certain types of tree will have large diameters, it is necessary to use callipers that have straightedges measuring about 1-1.5 m and legs measuring about 0.5 m. One problem with known callipers is that they are awkward and difficult to transport and difficult to carry around during ongoing surveys, since they may measure 1-1.5 m in one direction and about 0.5 m in a direction at right angles thereto.

This problem is overcome by means of the calliper-type instrument according to the present invention.

The present invention thus relates to a calliper-type instrument for measuring the diameter of a tree trunk, comprising a straightedge, a first and a second leg or jaw, a recording unit placed at the first leg and adapted to record and store trunk diameter measurements, wherein the first leg is fixedly positioned along the straightedge and wherein the second leg projects from a slide that can be displaced along the straightedge, wherein the legs and the straightedge are located in one and the same plane, and wherein the invention is characterized in that the first leg can be lowered in said plane and is pivotally fastened to an attachment on the straightedge; and in that the second leg can be lowered in said plane and is pivotally fastened to the slide; and in that the first leg is provided with a first fastener means adapted to be hooked in said fastener means; and in that the second leg is provided with a second fastener means that can be hooked into the slide.

Figure 2:
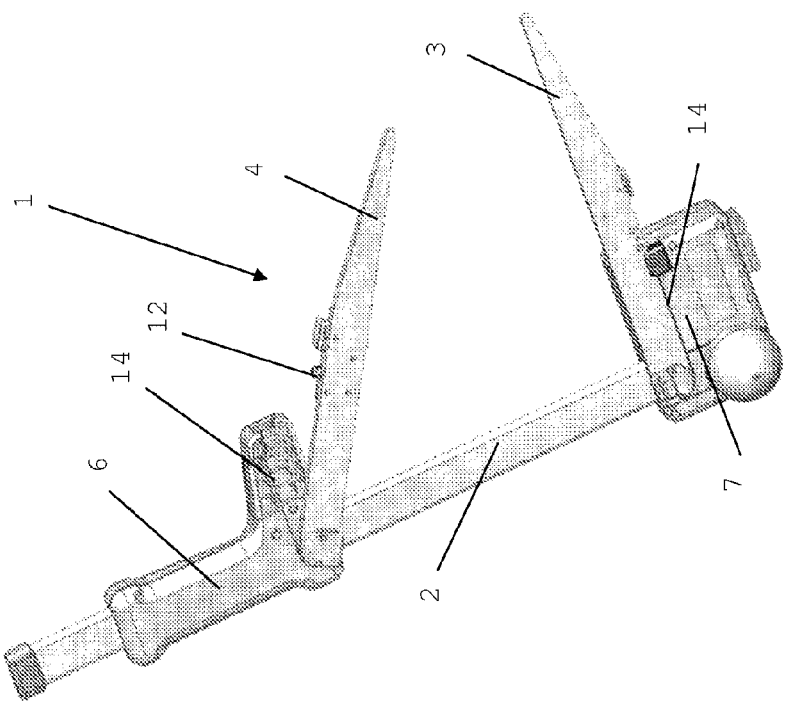
Figure 1:
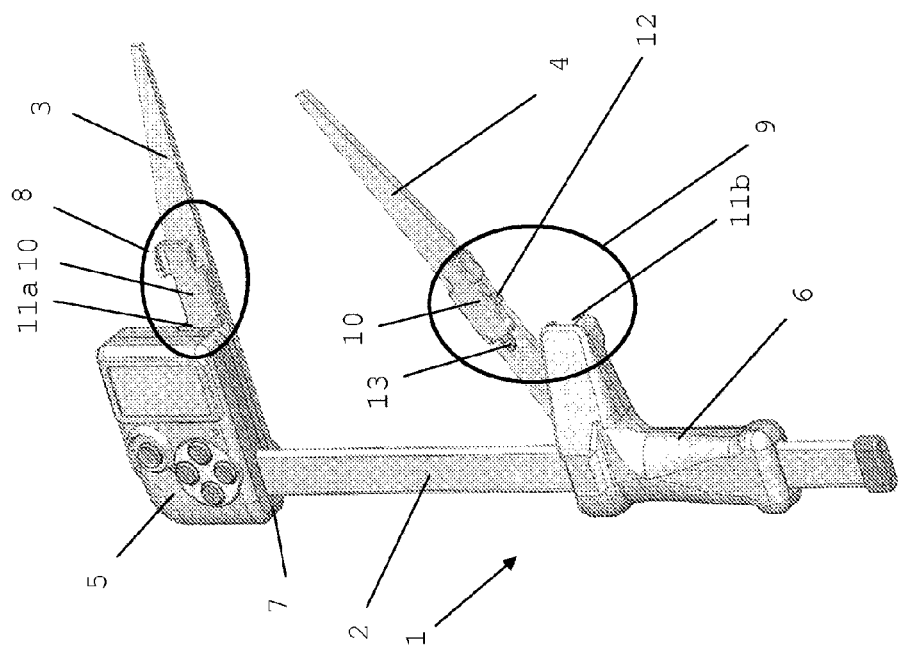

The invention will be now be described in more detail partly with reference to an exemplifying embodiment illustrated in the accompanying drawings, in which FIG. 1 is a schematic side view of a calliper-type measuring instrument; and FIG. 2 is a schematic view of the instrument shown in FIG. 1 from its other side.

The present invention relates to a calliper-type instrument 1 for measuring the diameter of a tree, comprising a straightedge 2 on which there is mounted a first leg or jaw 3 and a second leg or jaw 4. The instrument 1 also includes a recording unit 5 which is placed adjacent the first leg 3 and which is adapted to record and store measured tree diameters. The first leg 3 is fixedly positioned along the straightedge and the second leg 4 projects out from a slide 6 that can be displaced along the straightedge 2, wherein the legs 3, 4 and the straightedge are located in mutually the same plane.

According to the invention, the first leg 3 can be lowered in said plane and is pivotally attached to a fastener 7 on the straightedge 2. The second leg 4 can be lowered in said plane and is pivotally attached to the slide 6. The first leg 3 is provided with a first fastener means 8 which is intended to hook into the fastener means 7, and the second leg 4 is provided with a second fastener means 9 which is intended to hook into the slide 6, as shown in FIG. 1.

In order for tree diameters to be measured precisely, it is necessary that the legs 3, 4 are straight. Consequently, the legs 3, 4 will preferably be made from a wear resistant material and will therewith be uneven. Lightweight metal or tough plastic material are examples of suitable leg materials. Such materials will provide lightweight legs 3, 4 that are easy to carry by personnel working with the measurement instruments 1. In order to facilitate transportation of, or movement of, the instrument among the trees the legs 3 and 4 of an instrument 1 according to a preferred embodiment of the invention are arranged to enable them to be brought generally into line with each other and in said mutual plane. In these transportation positions, the legs 3, 4 are lowered to a position in which they are parallel with the straightedge 2.

When the inventive measuring instrument is in its operating mode, the first leg 3 is swung out to a position in which it is perpendicular to the straightedge 2.

When the inventive measuring instrument is in its use mode, the second leg 4 is also in an outwardly swung position perpendicular to the straightedge 2.

FIGS. 1 and 2 show the measuring instrument with the first leg 3 fastened in the fastener means 7 and the second leg 4 in a position in which it is free from the fastener means 9. According to a preferred embodiment, the fastener means 8, 9 may be disposed in any suitable manner whatsoever, so that the legs 3, 4 can be constantly held in a position in which they are perpendicular in relation to the straightedge 2. The first fastener means 8 and the second fastener means 9 include a hook-in part 10 disposed on respective legs 3, 4. Moreover, the fastener means 8, 9 include a first opening 11a and a second opening 11b provided respectively in the attachment 7 and the slide 6, with which the hook-in part 10 is intended to co act.

In order to achieve stability of the measuring instrument 1 between the straightedge 2 and the legs 3, 4 when said legs are in their outwardly extended positions, the fastener means 8, 9 are, according to one preferred embodiment of the invention, are placed at least a distance of 1/5 of the length of respective legs 3, 4 from said straightedge 2.

The calliper-type measuring instrument 1 can be readily handled in general when the legs 3, 4 are folded inwards. When the instrument 1 shall be used to measure tree diameters, the second leg 4 is first swung out towards the slide 6 about the fastener means in the slide 6; see FIG. 1. The hook-in part 10 is an outwardly projecting displaceable element 13 which is adapted to be displaced to its locking position with the aid of a spring. The operating button 12 of the hook-in part 10 linked with the element is therewith moved along the second leg 4 such as to draw the outwardly projecting element 13 into the hook-in part 10. The leg 4 is herewith moved towards a wall 14; see FIG. 2. When the operating button 12 is then moved back to its original position, the outwardly projecting element 13 is moved down in the opening 11b in the slide 6.

The first leg 3 is then lowered towards the fastener means 7 so as to fasten the first leg 3 in a manner similar to the hook-in procedure regarding the second leg 4. When both legs 3, 4 have been swung out and fastened to the fastener means 7 and to the slide 6 respectively, the legs 3, 4 will be secured firmly at right angles to the straightedge 2.

Although the present invention has been described with reference to a number of embodiments and usages, it will be understood that the calliper-type instrument 1 comprising the straightedge 2, the legs 3, 4, the slide and the fastener means 8, 9 may be constructed in other appropriate ways without departing from the basic concept of the invention.

The invention is therefore not restricted to the above embodiments but can be varied within the scope of the accompanying claims.

The invention claimed is:

1. A calliper-type instrument (1) for measuring the diameters of trees, comprising a straightedge (2) on which there is disposed a first leg or jaw (3) and a second leg or jaw (4), wherein the instrument includes a recording unit (5) which is placed on the first leg (3) and which is adapted to store and record measured tree diameters, wherein the first leg (3) is fixedly placed along the straightedge (2) and wherein the second leg (4) projects out from a slide (6) that can be displaced along the straightedge (2), wherein the legs (3, 4) and the straightedge are located in mutually the same plane, wherein the legs (3, 4) can be folded in said plane, and wherein the second leg (4) is pivotally mounted to the slide (6), characterized in that the first leg (3) is pivotally mounted to an attachment (7) on the straightedge (2); in that the first leg (3) is provided with a first fastener means (8) which is intended to hook into said attachment (7); in that the second leg (4) is provided with a second fastener means (9) which is intended to hook into the slide (6); in that the when the legs (3, 4) are in their outwardly extended positions said legs will be mutually parallel and perpendicular to the straightedge; in that the first fastener means (8) and the second fastener means (9) include a hook-in part (10) placed on respective legs; in that a first opening (1 Ia) and second opening (1 Ib) are placed respectively in the attachment (7) and in the slide (6) with which the hook-in part (10) is intended to co-act; and in that the fastener means (8, 9) are placed from the straightedge (2) by a distance equalling at least to 1/5 of the length of respective legs (3, 4).

2. A calliper-type measuring instrument (1) according to claim 1, characterized in that the first and the second legs (3, 4) are pivotally arranged so that they can be brought generally in line with each other.

3. A calliper-type measuring instrument (1) according to claim 1, characterized in that the hook-in part (10) is a displaceable, outwardly projecting element (13) which is arranged to be displaced to its locking position with the aid of a spring.

4. A calliper-type measuring instrument (1) according to claim 2, characterized in that the hook-in part (10) is a displaceable, outwardly projecting element (13) which is arranged to be displaced to its locking position with the aid of a spring.

* * * * *